US008839238B2

(12) United States Patent
Huang et al.

(10) Patent No.: US 8,839,238 B2
(45) Date of Patent: Sep. 16, 2014

(54) DYNAMIC VIRTUAL MACHINE SHUTDOWN WITHOUT SERVICE INTERRUPTIONS

(75) Inventors: Hai Huang, White Plains, NY (US); Yaoping Ruan, White Plains, NY (US); Sambit Sahu, Hopewell Junction, NY (US); Anees A. Shaikh, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 12/813,926

(22) Filed: Jun. 11, 2010

(65) Prior Publication Data

US 2011/0307887 A1 Dec. 15, 2011

(51) Int. Cl.
*G06F 9/455* (2006.01)
*G06F 9/48* (2006.01)
*G06F 1/32* (2006.01)
*G06F 9/50* (2006.01)

(52) U.S. Cl.
CPC ............ *G06F 9/485* (2013.01); *G06F 9/45558* (2013.01); *G06F 2009/45575* (2013.01); *G06F 1/3287* (2013.01); *G06F 1/3228* (2013.01); *G06F 9/5094* (2013.01); *Y02B 60/1282* (2013.01)
USPC .............................................. 718/1; 709/224

(58) Field of Classification Search
None
See application file for complete search history.

(56) References Cited

U.S. PATENT DOCUMENTS

| | | | |
|---|---|---|---|
| 8,065,676 B1* | 11/2011 | Sahai et al. ................. 718/1 |
| 8,161,321 B2* | 4/2012 | Zheng et al. ................ 714/15 |
| 8,176,486 B2* | 5/2012 | Amir Husain .................. 718/1 |
| 2005/0132367 A1* | 6/2005 | Tewari et al. ................. 718/1 |
| 2005/0289540 A1* | 12/2005 | Nguyen et al. ................ 718/1 |
| 2005/0289648 A1* | 12/2005 | Grobman et al. .............. 726/12 |
| 2006/0029056 A1* | 2/2006 | Perera et al. ................ 370/386 |
| 2007/0169121 A1* | 7/2007 | Hunt et al. .................... 718/1 |
| 2007/0174410 A1* | 7/2007 | Croft et al. ................. 709/208 |
| 2008/0201479 A1* | 8/2008 | Husain et al. .............. 709/227 |
| 2009/0198766 A1* | 8/2009 | Chen et al. ................. 709/202 |
| 2009/0204963 A1* | 8/2009 | Swart et al. ................... 718/1 |
| 2009/0235247 A1* | 9/2009 | Cho et al. ...................... 718/1 |
| 2010/0211829 A1* | 8/2010 | Ziskind et al. ................ 714/48 |
| 2010/0333100 A1* | 12/2010 | Miyazaki et al. ............ 718/103 |
| 2011/0099267 A1* | 4/2011 | Suri et al. ................... 709/224 |
| 2011/0106949 A1* | 5/2011 | Patel et al. .................. 709/226 |
| 2011/0138147 A1* | 6/2011 | Knowles et al. ............. 711/170 |
| 2011/0179253 A1* | 7/2011 | Yehuda et al. ................ 712/42 |
| 2011/0191477 A1* | 8/2011 | Zhang et al. ................ 709/226 |
| 2011/0191610 A1* | 8/2011 | Agarwal et al. ............. 713/310 |
| 2011/0239010 A1* | 9/2011 | Jain et al. .................... 713/310 |
| 2011/0264937 A1* | 10/2011 | Meisner et al. ............. 713/323 |
| 2011/0314470 A1* | 12/2011 | Elyashev et al. ............... 718/1 |
| 2012/0089663 A1* | 4/2012 | Sedayao et al. ............. 709/202 |
| 2012/0096158 A1* | 4/2012 | Astete et al. ................ 709/225 |

* cited by examiner

*Primary Examiner* — Emerson Puente
*Assistant Examiner* — Mehran Kamran
(74) *Attorney, Agent, or Firm* — Louis J. Percello; Ryan, Mason & Lewis, LLP (57) ABSTRACT

Techniques for dynamically managing a sleep state of a virtual machine are provided. The techniques include detecting idleness of a virtual machine, putting the idle virtual machine into a sleep state, implementing a virtual machine surrogate, wherein the virtual machine surrogate listens to network traffic, enabling the virtual machine to handle network traffic that is capable of being handled by the virtual machine, and enabling the virtual machine to queue network traffic and wake-up the virtual machine in the sleep state for network traffic that the virtual machine surrogate is incapable of handling.

17 Claims, 4 Drawing Sheets

① IDLENESS IS DETECTED, PUT TO SLEEP
② A VIRTUAL MACHINE SURROGATE IS INSTANTIATED TO LISTEN TO NETWORK TRAFFIC
③ VM SURROGATE HANDLES "EASY" NETWORK TRAFFIC, e.g., PING, ECHO, etc.
④ FOR OTHER TYPES OF TRAFFIC, VM SURROGATE WILL BUFFER THE NETWORK TRAFFIC AND WAKE UP THE SLEEPING VM
⑤ WHEN THE SLEEP VM IS WOKEN UP, THE NETWORK TRAFFIC IS REPLAYED BY THE VM SURROGATE

DYNAMIC VIRTUAL MACHINE SHUTDOWN WITHOUT SERVICE INTERRUPTIONS

FIELD OF THE INVENTION

Embodiments of the invention generally relate to information technology, and, more particularly, to virtual machine operations.

BACKGROUND OF THE INVENTION

In a cloud computing environment, allowing machines (virtual and physical) to be put to sleep without loss of requests presents a challenge. Existing approaches include, for example, putting machines to sleep except for the network interface, and upon receiving a special packet, the network interface wakes up the machine.

However, such approaches require some form of centralized control or a workload dispatcher that controls which machines are active and which are inactive. In a more decentralized environment such as, for example, a cloud computing environment, such a dispatcher will often not exist, especially across different users.

Existing approaches can also include paging idle memory out and running idle VMs at a lower central processing unit (CPU) priority. However, with such approaches, each VM still uses memory and a percentage of CPU while idling.

SUMMARY OF THE INVENTION

Principles and embodiments of the invention provide techniques for dynamic virtual machine shutdown without service interruptions. An exemplary method (which may be computer-implemented) for dynamically managing a sleep state of a virtual machine, according to one aspect of the invention, can include steps of detecting idleness of a virtual machine, putting the idle virtual machine into a sleep state, implementing a virtual machine surrogate, wherein the virtual machine surrogate listens to network traffic, enabling the virtual machine to handle network traffic that is capable of being handled by the virtual machine, and enabling the virtual machine to queue network traffic and wake-up the virtual machine in the sleep state for network traffic that the virtual machine surrogate is incapable of handling.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Principles of the invention include enablement of dynamic virtual machine shutdown without service interruptions. One or more embodiments of the invention include virtual machine surrogates that can be either implemented as low-overhead virtual machines or processes that run in the hypervisor. These machines will listen to the network interface in place of the machines that are put to sleep, allowing resources to be freed to do more meaningful work. Additionally, in one or more embodiments of the invention, the beneficiary is not only limited to virtual machines, but also extends to physical machines as well.

One or more embodiments of the invention include enabling virtual machines to be put to sleep when not in use without losing functionalities. Additionally, resources in a virtual environment can be used more efficiently, as opposed to idling. One or more embodiments of the invention can enable higher resource utilization as well as lower operational costs by detecting idle virtual machines (VMs) and powering-down idle VMs without interrupting services provided by those VMs.

Figure 1:
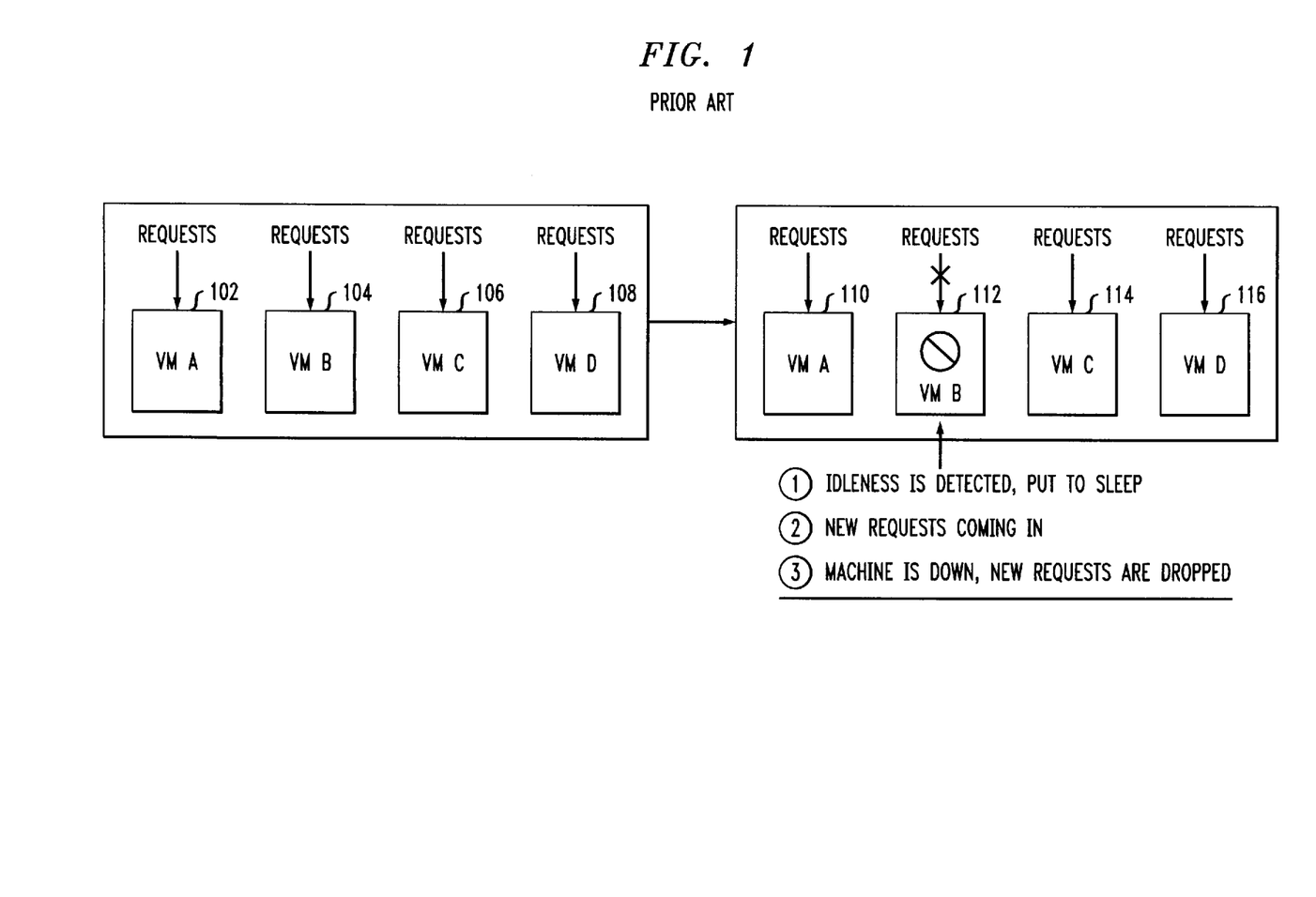
FIG. 1 is a diagram illustrating an existing scenario involving putting a virtual machine (VM) to sleep in a cloud.

FIG. 1 is a diagram illustrating an existing scenario involving putting a VM to sleep in a cloud. By way of illustration, FIG. 1 depicts, in the first sequence, active VM (A) 102, active VM (B) 104, active VM (C) 106 and active VM (D) 108, all of which are receiving requests. In the second sequence, FIG. 1 depicts active VM (A) 110, idle VM (B) 112, active VM (C) 114 and active VM (D) 116, all of which are receiving requests. As depicted in FIG. 1, with respect to idle VM 112, the idleness is detected and the VM is put to sleep. As a result, the machine is down, and new requests that come in are dropped.

Figure 2:
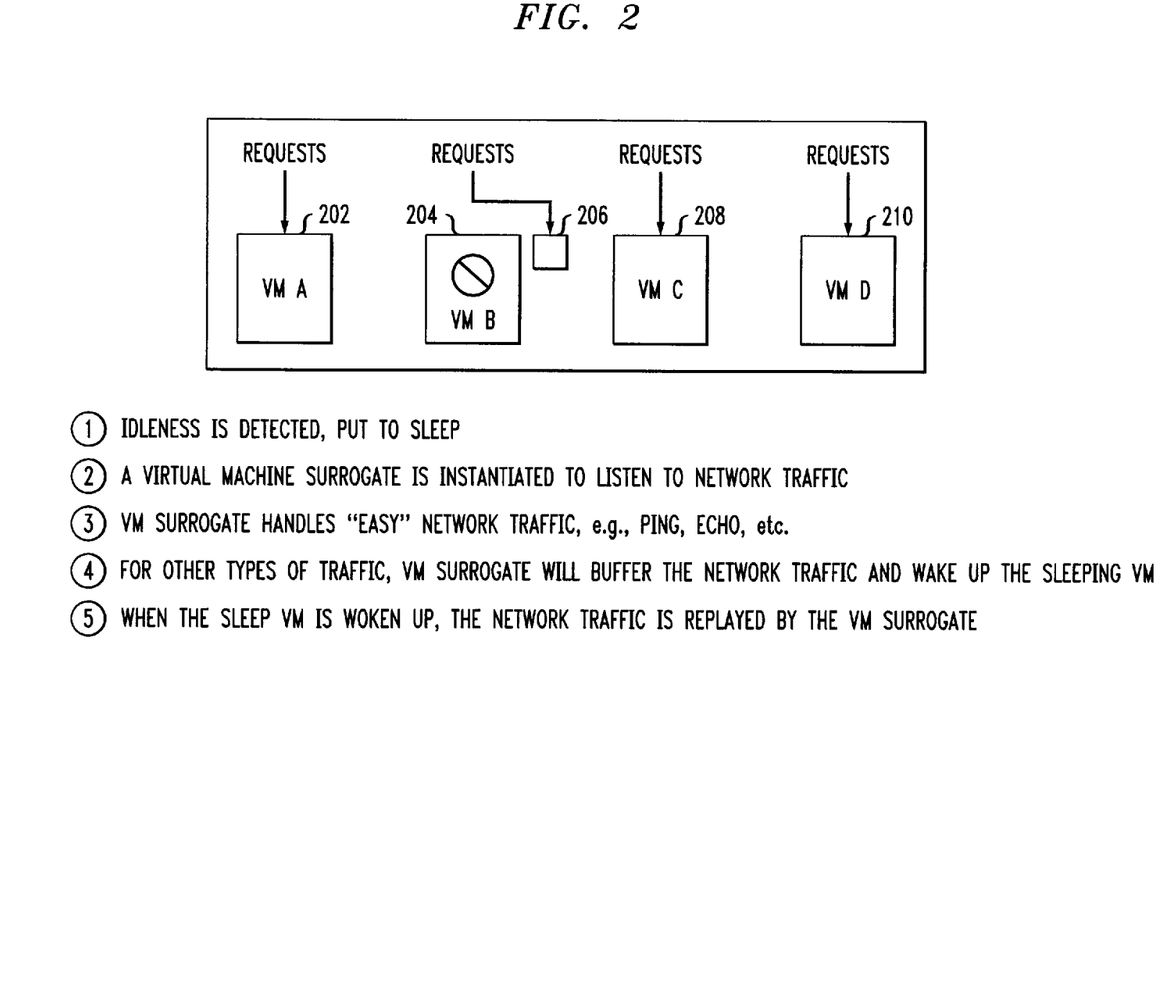
FIG. 2 is a diagram illustrating enablement of virtual machines being put to a sleep state without loss of functionalities, according to an embodiment of the present invention.

FIG. 2 is a diagram illustrating enablement of virtual machines being put to a sleep state without loss of functionalities, according to an embodiment of the present invention. By way of illustration, FIG. 2 depicts VM (A) 202, idle VM (B) 204, VM surrogate 206, active VM (C) 208 and active VM (D) 210, with requests being sent to the VMs.

Additionally, as depicted in FIG. 2, the idleness of VM 204 is detected, and the VM is put to sleep. A VM surrogate 206 is instantiated to listen to network traffic, some of which the VM surrogate can handle (such as, for example, ping, echo, etc.). For other types of traffic, the VM surrogate can buffer the network traffic and wake up the sleeping VM. Further, when the sleeping VM is woken up, the network traffic is replayed by the VM surrogate. In one or more embodiments of the invention, a VM surrogate can be a low-profile VM or a small-footprint process.

As detailed herein, in one or more embodiments of the invention, having VMs put to sleep state allows higher hardware utilization, and also allows for more opportunity for energy savings in the hardware infrastructure. Further, one or more embodiments of the invention include precluding the need of implementing an exact mechanism to decide when to put VMs to sleep. Additionally, one or more embodiments of the invention include enabling services to be provided to allow finer-grained and cheaper pricing models.

Figure 3:
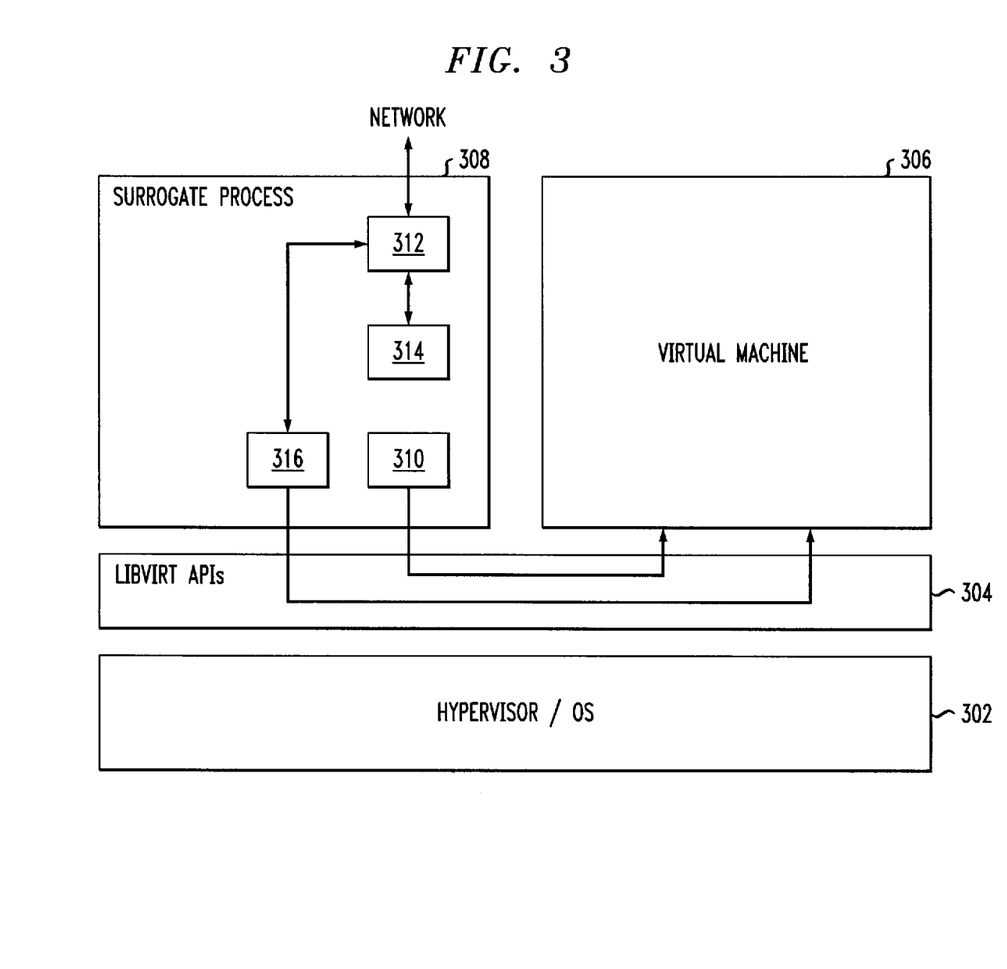
FIG. 3 is a block diagram illustrating an exemplary embodiment, according to an aspect of the invention.

FIG. 3 is a block diagram illustrating an exemplary embodiment, according to an aspect of the invention. By way of illustration, FIG. 3 depicts a hypervisor and/or operating system (OS) 302, a libvirt application programming interface (API) component 304, a virtual machine 306 and a surrogate process component 308. The surrogate process component 308 includes an idleness detection module 310, a network proxy module 312, a service proxy module 314 and a virtual machine (VM) state control module 316.

Idleness detection module 310 uses the libvirt API component 304 to detect when a VM is idle, and communicates with VM state control module 316 to put the VM 306 to sleep state. Network proxy module 312 listens to the network interface of the VM that was put to sleep by idleness detection module 310. Service proxy module 314 handles network traffic of certain types (for example, echo, ping, telnet, etc.) that do not require waking up the sleeping VM. Additionally, VM state control module 316, using the libvirt API component 304, wakes up a VM as directed by network proxy module 312 or put a VM to sleep by idleness detection module 310.

Figure 4:
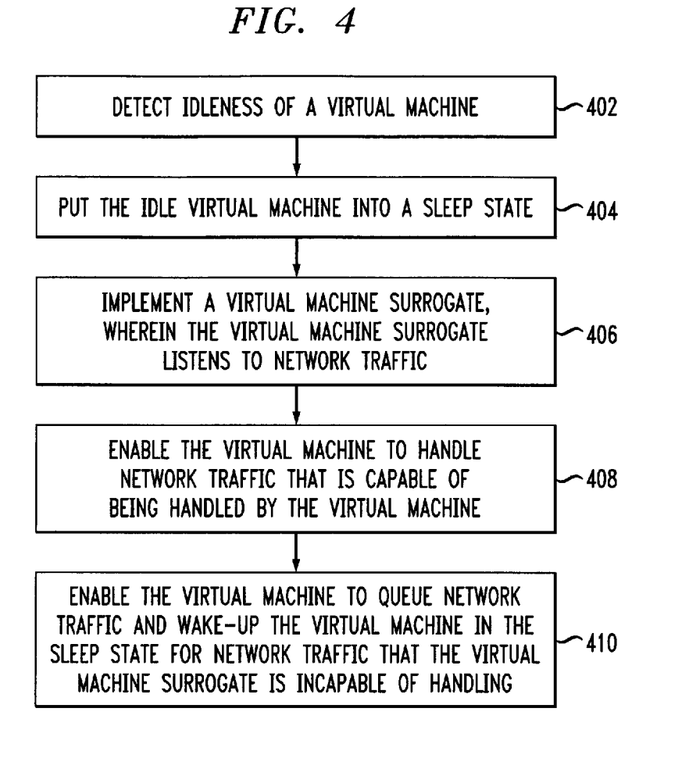
FIG. 4 is a flow diagram illustrating techniques for dynamically managing a sleep state of a virtual machine, according to an embodiment of the invention.

FIG. 4 is a flow diagram illustrating techniques for dynamically managing a sleep state of a virtual machine, according to an embodiment of the present invention. Step 402 includes detecting idleness of a virtual machine. This step can be carried out, for example, using an idleness detection module. Additionally, libvirt APIs in a hypervisor can also be used to detect network activity, storage device activity, and other resource usage data of a virtual machine.

A virtual machine surrogate can include, for example, a low-profile virtual machine and/or a small footprint process. A "low-profile" virtual machine, as used herein, can include a virtual machine that consumes a much lower quantity of resources, usually memory, in place of the virtual machine that is put into sleep mode. Similar to low-profile virtual machine, a "small footprint process" includes low resource consumption, usually memory.

Step 404 includes putting the idle virtual machine into a sleep state. This step can be carried out, for example, using a virtual machine (VM) state control module. One or more embodiments can also include using libvirt APIs to suspend a virtual machine.

Step 406 includes implementing a virtual machine surrogate, wherein the virtual machine surrogate listens to network traffic. This step can be carried out, for example, using a network proxy module. One or more embodiments can also include using a user process that is capable of listening to the same network interface as the virtual machine that was put to sleep.

Step 408 includes enabling the virtual machine to handle network traffic that is capable of being handled by the virtual machine (network traffic such as, for example, ping, echo, etc. and workloads such as, for example, telnet, ssh, etc.). This step can be carried out, for example, using a service proxy module. One or more embodiments of the invention can also include using custom scripts or functions within the context of the process used in a network proxy module.

Step 410 includes enabling the virtual machine to queue network traffic (for example, all network traffic types including unicasts, multicasts, broadcasts, etc.) and wake-up the virtual machine in the sleep state for network traffic that the virtual machine surrogate is incapable of handling. This step can be carried out, for example, using a network proxy module to capture a particular type of traffic that it decides would require waking the VM, and a VM state control module to carry out the wake up procedures.

The techniques depicted in FIG. 4 can also include replaying, by the virtual machine surrogate, the queued network traffic for the virtual machine after the virtual machine surrogate has woken-up the virtual machine (so as, for example, to prevent work loss).

The techniques depicted in FIG. 4 can also, as described herein, include providing a system, wherein the system includes distinct software modules, each of the distinct software modules being embodied on a tangible computer-readable recordable storage medium. The distinct software modules can include, for example, an idleness detection module, a network proxy module, a service proxy module and a virtual machine state control module executing on a hardware processor.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Figure 5:
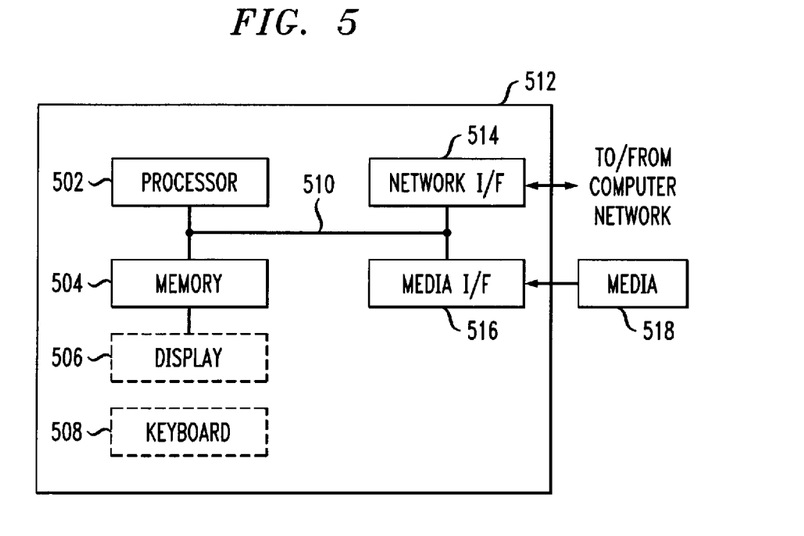
FIG. 5 is a system diagram of an exemplary computer system on which at least one embodiment of the invention can be implemented.

One or more embodiments of the invention, or elements thereof, can be implemented in the form of an apparatus including a memory and at least one processor that is coupled to the memory and operative to perform exemplary method steps. One or more embodiments can make use of software running on a general purpose computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry.

Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 518 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 3. The method steps can then be carried out using the distinct software modules and/or sub-modules of the system, as described above, executing on one or more hardware processors 502. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, enabling virtual machines to be put to sleep when not used without losing any functionality.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for dynamically managing a sleep state of a virtual machine, wherein the method comprises:
using a virtualization component API that can handle multiple types of hypervisors, to detect idleness of a virtual machine;
putting the idle virtual machine into a sleep state;
instantiating a virtual machine surrogate when the virtual machine is put into the sleep state to operate on behalf of the virtual machine, wherein instantiating a virtual machine surrogate comprises instantiating a network proxy module that listens to network traffic, and instantiating a service proxy module that executes workloads;
enabling the virtual machine surrogate to handle network traffic that is capable of being handled by the virtual machine surrogate on behalf of the virtual machine in the sleep state, wherein handing network traffic comprises the virtual machine surrogate using the service proxy module of the virtual machine surrogate for executing a workload on behalf of the virtual machine in the sleep state, wherein executing a workload comprises the service proxy module establishing a network connection with one or more network devices in a network and issuing commands to the one or more network devices to execute the workload; and
enabling the virtual machine surrogate to queue network traffic and using the virtualization component API to wake-up the virtual machine in the sleep state for network traffic that the virtual machine surrogate is incapable of handling,
wherein the virtual machine surrogate comprises a low-profile virtual machine and small foot-print process that have low memory consumption.

2. The method of claim 1, further comprising replaying, by the virtual machine surrogate, the queued network traffic for the virtual machine after the virtual machine surrogate has woken-up the virtual machine.

3. The method of claim 1, wherein the virtual machine surrogate comprises at least one of a processor and a virtual machine.

4. The method of claim 1, wherein the virtual machine surrogate is capable of handling network traffic for one or more virtual machines.

5. The method of claim 1, further comprising providing a system, wherein the system comprises one or more distinct software modules, each of the one or more distinct software modules being embodied on a tangible computer-readable recordable storage medium, and wherein the one or more distinct software modules comprise an idleness detection module, the network proxy module, the service proxy module and a virtual machine state control module executing on a hardware processor.

6. A computer program product comprising a non-transitory computer readable recordable storage medium including computer useable program code for dynamically managing a sleep state of a virtual machine, the computer program product including:

computer useable program code for using a virtualization component API that can handle multiple types of hypervisors, to detect idleness of a virtual machine;

computer useable program code for putting the idle virtual machine into a sleep state;

computer useable program code for instantiating a virtual machine surrogate when the virtual machine is put into the sleep state to operate on behalf of the virtual machine, wherein instantiating a virtual machine surrogate comprises instantiating a network proxy module that listens to network traffic, and instantiating a service proxy module that executes workloads;

computer useable program code for enabling the virtual machine surrogate to handle network traffic that is capable of being handled by the virtual machine surrogate on behalf of the virtual machine in the sleep state, wherein handing network traffic comprises the virtual machine surrogate using the service proxy module of the virtual machine surrogate for executing a workload on behalf of the virtual machine in the sleep state, wherein executing a workload comprises the service proxy module establishing a network connection with one or more network devices in a network and issuing commands to the one or more network devices to execute the workload; and computer useable program code for enabling the virtual machine surrogate to queue network traffic and using the virtualization component API to wake-up the virtual machine in the sleep state for network traffic that the virtual machine surrogate is incapable of handling, wherein the virtual machine surrogate comprises a low-profile virtual machine and small foot-print process that have low memory consumption.

7. The computer program product of claim 6, wherein the virtual machine surrogate comprises at least one of a processor and a virtual machine.

8. The computer program product of claim 6, wherein the virtual machine surrogate is capable of handling network traffic for one or more virtual machines.

9. The computer program product of claim 6, further comprising computer useable program code for replaying, by the virtual machine surrogate, the queued network traffic for the virtual machine after the virtual machine surrogate has woken-up the virtual machine.

10. A system for dynamically managing a sleep state of a virtual machine, comprising:

a memory; and at least one processor coupled to the memory and operative to:

use a virtualization component API that can handle multiple types of hypervisors, to detect idleness of a virtual machine;

put the idle virtual machine into a sleep state;

instantiate a virtual machine surrogate when the virtual machine is put into the sleep state to operate on behalf of the virtual machine, wherein instantiating a virtual machine surrogate comprises instantiating a network proxy module that listens to network traffic, and instantiating a service proxy module that executes workloads;

enable the virtual machine surrogate to handle network traffic that is capable of being handled by the virtual machine surrogate on behalf of the virtual machine in the sleep state, wherein handing network traffic comprises the virtual machine surrogate using the service proxy module of the virtual machine surrogate for executing a workload on behalf of the virtual machine in the sleep state, wherein executing a workload comprises the service proxy module establishing a network connection with one or more network devices in a network and issuing commands to the one or more network devices to execute the workload; and enable the virtual machine surrogate to queue network traffic and use the virtualization component API to wake-up the virtual machine in the sleep state for network traffic that the virtual machine surrogate is incapable of handling, wherein the virtual machine surrogate comprises a low-profile virtual machine and small foot-print process that have low memory consumption.

11. The system of claim 10, wherein the virtual machine surrogate comprises at least one of a processor and a virtual machine.

12. The system of claim 10, wherein the virtual machine surrogate is capable of handling network traffic for one or more virtual machines.

13. The system of claim 10, wherein the at least one processor coupled to the memory is further operative to replay, by the virtual machine surrogate, the queued network traffic for the virtual machine after the virtual machine surrogate has woken-up the virtual machine.

14. The system of claim 10, further comprising a tangible computer-readable recordable storage medium having one or more distinct software modules embodied thereon, wherein the one or more distinct software modules comprise an idleness detection module, the network proxy module, the service proxy module and a virtual machine state control module executing on a hardware processor.

15. An apparatus for dynamically managing a sleep state of a virtual machine, the apparatus comprising:

means for using a virtualization component API that can handle multiple types of hypervisors, to detect idleness of a virtual machine;

means for putting the idle virtual machine into a sleep state;

means for instantiating a virtual machine surrogate when the virtual machine is put into the sleep state to operate on behalf of the virtual machine, wherein the means for instantiating a virtual machine surrogate comprises means for instantiating a network proxy module that listens to network traffic, and means for instantiating a service proxy module that executes workloads;

means for enabling the virtual machine surrogate to handle network traffic that is capable of being handled by the virtual machine surrogate on behalf of the virtual machine in the sleep state, wherein handing network traffic comprises the virtual machine surrogate using the service proxy module of the virtual machine surrogate for executing a workload on behalf of the virtual machine in the sleep state, wherein executing a workload comprises the service proxy module establishing a network connection with one or more network devices in a network and issuing commands to the one or more network devices to execute the workload; and means for enabling the virtual machine surrogate to queue network traffic and using the virtualization component API to wake-up the virtual machine in the sleep state for network traffic that the virtual machine surrogate is incapable of handling,
wherein the virtual machine surrogate comprises a low-profile virtual machine and small foot-print process that have low memory consumption.

16. The apparatus of claim 15, wherein the virtual machine surrogate comprises at least one of a processor and a virtual machine.

17. The apparatus of claim 15, further comprising means for replaying, by the virtual machine surrogate, the queued network traffic for the virtual machine after the virtual machine surrogate has woken-up the virtual machine.

* * * * *